United States Patent [19]
Harlow

[11] 3,839,610
[45] Oct. 1, 1974

[54] STEERING MECHANISM FOR RIDING MOWER

[76] Inventor: Henley C. Harlow, 1632 Hodges St., Lake Charles, La. 70601

[22] Filed: Sept. 1, 1972

[21] Appl. No.: 285,702

[52] U.S. Cl. .............................................. 280/92
[51] Int. Cl. .................................................... B60p
[58] Field of Search........................ 280/92; 198/112

[56] References Cited
UNITED STATES PATENTS

| | | | |
|---|---|---|---|
| 583,680 | 6/1897 | Frost | 74/611 |
| 1,330,116 | 2/1920 | Hunt | 198/112 |
| 1,424,822 | 8/1922 | Herds | 280/92 |
| 1,616,295 | 2/1927 | Yourter | 280/92 |
| 2,969,138 | 12/1961 | Sykokis | 198/208 |
| 3,576,142 | 4/1971 | Matthew | 74/611 |

Primary Examiner—Richard E. Aegerter
Attorney, Agent, or Firm—Misegades, Douglas & Levy

[57] ABSTRACT

A mechanism for steering the rear wheel drive on a three-wheel riding mower having a steering wheel shaft to drive a sprocket, a steering frame for mounting a wheel means and a steering chain passing over the steering sprocket to the steering frame and locked thereon by a locking bolt. A set of chain idler gears is provided to tension the chain and to allow the chain to fold or turn back onto the steering frame in the same direction as the chain feeds from the steering sprocket.

2 Claims, 2 Drawing Figures

PATENTED OCT 1 1974 3,839,610

STEERING MECHANISM FOR RIDING MOWER

CROSS-REFERENCES TO RELATED DATA

The present invention is an improvement invention over the following prior art which is of background relevancy only:
Gryckowski 1,546,231
Gardner 2,885,019
Hufford 3,069,182

BRIEF SUMMARY OF THE INVENTION

The invention relates to an improvement device for steering a rider type mower of the rotary blade type, and more particularly the invention relates to a device for improving the steering mechanism for three-wheel riding mowers in which a steering wheel shaft drives a sprocket which in turn drives a chain via an idler gear to turn a steering yoke.

FIELD OF THE INVENTION

An object of the present invention is to provide a simple, improved and effective means for mounting wheel means and a steering mechanism engaged therewith by a steering chain in a manner so that the chain engages a steering sprocket and idler gear means to effectively provide greater space to the mower driver who is more free of mechanical obstructions.

A further object and advantage of the invention is to provide an improved chain driven steering mechanism for eliminating physical obstructions for a mower operator and, at the same time, provide improved mechanical means to operate the mower.

Another object and advantage of the invention is to provide a uniformly installed steering mechanism for three-wheel mowers carrying the operator of the motive vehicle so that improved construction and operation of the mower are achieved.

An additional object of the invention is to provide a steering mechanism for a rear wheel steering arrangement in which chain guards are provided for the steering chain and a steering stop is secured rearwardly of the wheel yoke but which may engage the wheel yoke on maximum right and left turns.

BRIEF DESCRIPTION OF THE SEVERAL VIEWS OF THE DRAWING

The above and other objects and advantages of the invention will become apparent upon full consideration of the following detailed description and accompanying drawings in which.

DETAILED DESCRIPTION OF THE PREFERRED EMBODIMENT

Figure 1:
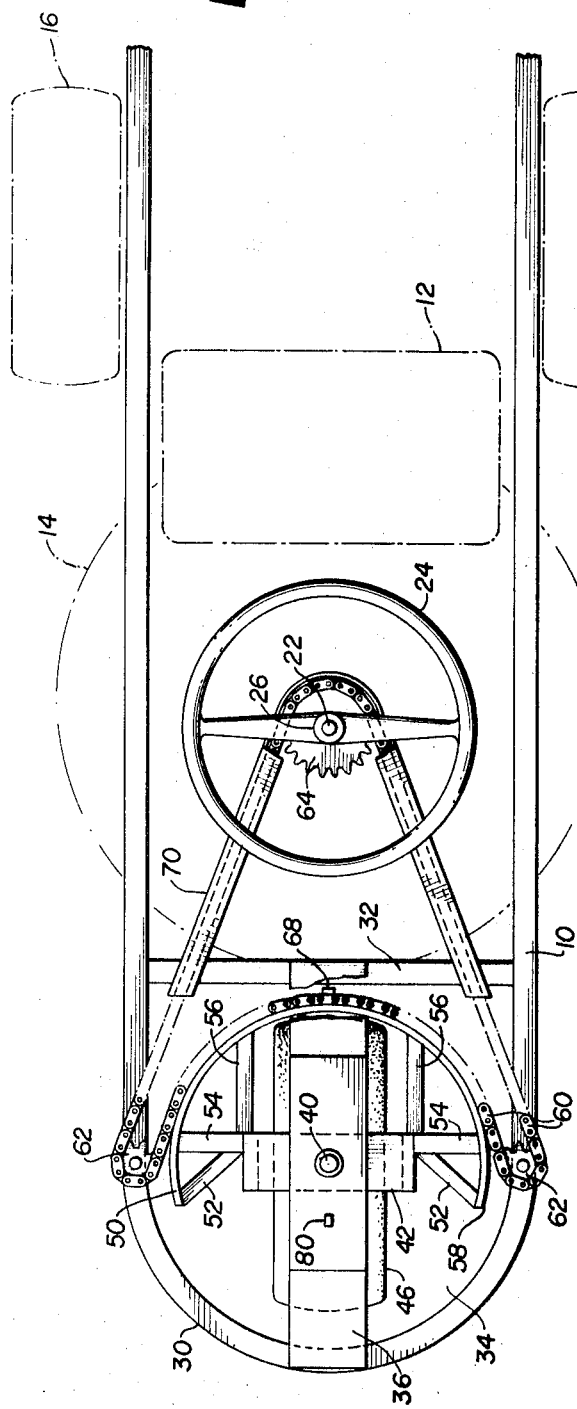
FIG. 1 is a top view in part broken away of a steering system and mechanism for a riding mower, according to a preferred embodiment of the invention.

Referring now to the drawings, there is shown a rider mower frame 10 for a mower of the type having three or more supporting wheels, an engine space 12 and a cutter blade space 14. At one end of the frame 10, there may be driving wheels mounted in wheel space 16. An engine in the engine space 12 is coupled to drive cutter blades in the cutter blade space 14 and coupled to driving wheels mounted in the wheel space 16 in any of several conventional modes.

Intermediate the ends of the frame, is an essentially vertically oriented steering column 20 containing coaxially therein a steering shaft 22 and having a steering wheel 24 fixedly secured to the steering shaft 22 by conventional securing means such as a nut 26 threadedly engaging and mating threaded portion of the shaft (not shown). The steering wheel 24 may be keyed to the shaft or other well known means to fixedly orient the steering wheel 24 to the steering shaft 22.

Figure 2:
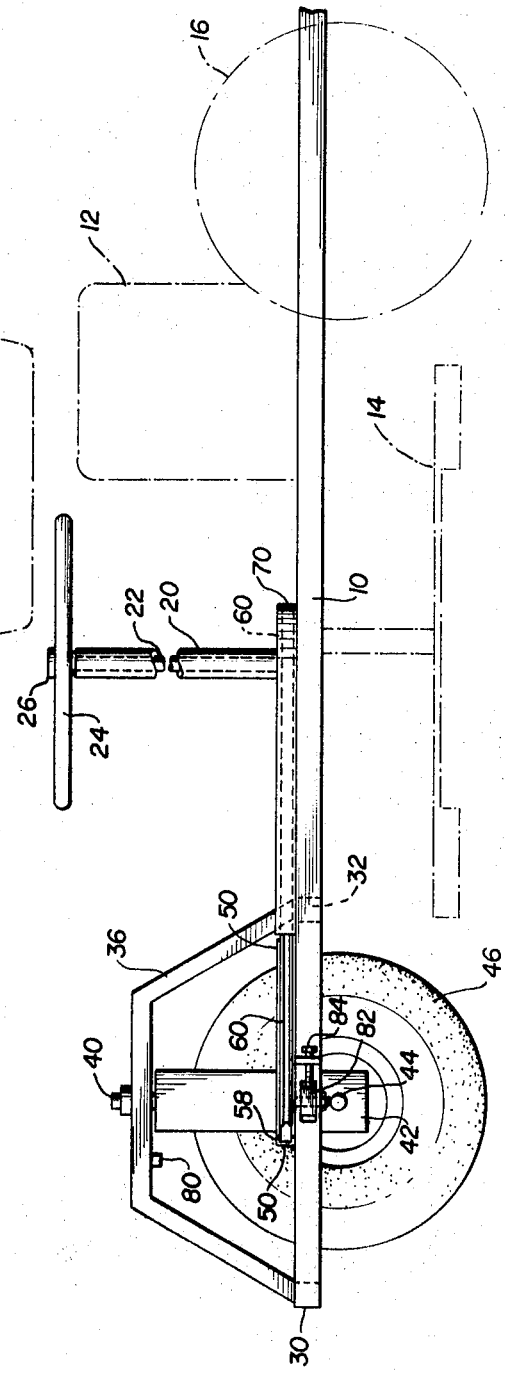
FIG. 2 is a side view of the mechanism shown in FIG. 1.

A rear portion of the frame 10 is shown as a semicircular contoured member 30, and that member together with a cross frame member 32 forms a steering space 34 for mounting a frame section 36 shown as a trapezoidal configuration (FIG. 2). In a mid-portion of a horizontal section of the frame section 36 is pivot means 40 with bearings for rotatably mounting a wheel yoke 42 in which is further rotatably mounted on an axle 44 a single wheel 46 in conventional manner for performing a turning operation.

Peripherally extending about the wheel yoke 42 and shown mounted therefrom is a steering yoke 50 of generally semi-circular shape having sets of supporting elements 52,54,56 extending from the wheel yoke 42, as shown. The steering yoke 50 may be constructed to be provided with lips or extensions 58 to form a U-shaped channel for receiving in place and guiding thereon a steering chain 60, as shown, the steering chain feeding over te surface of the steering yoke 50 onto and around a set of chain idler gear means 62,62, and thence around a steering sprocket 64. Each of the ends of the steering chain 60 terminates at a selected mid-point of the steering yoke 50 and is secured thereon by a locking bolt 68. The steering sprocket 64 is fixedly secured onto the steering shaft distal from the steering wheel 24.

A guard 70 provides protection of the chain 60 from engagement with foreign bodies and the guard extends between the steering sprocket 64 and the idler gear means 62,62.

A steering stop 80 is welded from the underside of the frame section 36 and engages at the end turn positions with the wheel yoke 42 for restraining excessive turning movement of the wheel yoke.

Adjustable mechanical means 82 provides an adjustment in the tensioning of the steering chain 60 and may comprise a threadedly adjustable means 84.

By the apparatus of the present invention, a new and improved steering mechanism for the rear wheel of a three-wheel riding mower is provided as a mechanism located below the mower and is free from all obstructions of the mower operator, and it is easily accessible for making adjustments and repairs.

Additional embodiments of the invention in this specification will occur to others and therefore it is intended that the scope of the invention be limited only by the appended claims and not by the embodiment described hereinabove. Accordingly, reference should be made to the following claims in determining the full scope of the invention.

What is claimed is:

1. A steering mechanism for a three-wheel mower comprising:
    a frame for a riding mower constructed, contoured and arranged to mount an engine for driving a cutter blade and a set of wheels mounted in drive coupling thereto;

a steering column containing a steering shaft therein mounted intermediate the ends of the frame and having a steering wheel secured to the upper end of said shaft, a steering sprocket fixedly disposed at a point on the shaft distal to said steering wheel;

a pivotally mounted wheel yoke so mounted from said frame and a wheel supported therein for effecting a turning operation, a steering yoke secured to and peripherally mounted about said wheel yoke for rotation therewith;

a set of chain idler gear means mounted on said frame outwardly of said steering yoke;

a steering chain having its ends secured at a generally common junction on an outer surface of said steering yoke and being threadedly looped over said chain idler gear means, and said steering sprocket being generally beneath an area occupied by an operator; the steering chain being threaded over said outer surface of said steering yoke so that the same relative length of chain between the set of chain idler gear means is always essentially the same;

a chain guard extending to encompass the steering chain as it extends between said chain idler gear means and said steering sprocket;

a steering stop means mounted upon said frame to restrain excessive turning movement of said wheel yoke;

at least one of the chain idler gear means of said set adjustably mounted to maintain effective and operable tension of said steering chain, and said chain guard means extending also to encompass the steering sprocket as the chain extends between the chain idler gear means and over the steering sprocket.

2. The invention according to claim 1 wherein the steering mechanism as mounted upon said frame is positioned below a mower operator space and is free from all obstructions of an operator, and is easily accessible for making adjustments and repairs.

* * * * *